US012409848B2

(12) United States Patent
Nakabayashi et al.

(10) Patent No.: US 12,409,848 B2
(45) Date of Patent: Sep. 9, 2025

(54) VEHICLE INFORMATION NOTIFICATION DEVICE

(71) Applicant: HONDA MOTOR CO., LTD., Tokyo (JP)

(72) Inventors: Shunichi Nakabayashi, Tokyo (JP); Masato Nakata, Tokyo (JP); Akihiko Tomoda, Tokyo (JP); Ko Hosokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 18/036,906

(22) PCT Filed: Oct. 18, 2021

(86) PCT No.: PCT/JP2021/038476
§ 371 (c)(1),
(2) Date: May 15, 2023

(87) PCT Pub. No.: WO2022/107529
PCT Pub. Date: May 27, 2022

(65) Prior Publication Data
US 2023/0415765 A1 Dec. 28, 2023

(30) Foreign Application Priority Data
Nov. 19, 2020 (JP) ................. 2020-192290

(51) Int. Cl.
*B60W 50/16* (2020.01)
*B60W 10/18* (2012.01)
(Continued)

(52) U.S. Cl.
CPC ............ *B60W 50/16* (2013.01); *B60W 10/18* (2013.01); *B60W 10/20* (2013.01); *B62J 50/22* (2020.02); *B60W 2050/146* (2013.01)

(58) Field of Classification Search
CPC ..... B60T 8/1706; B60W 10/18; B60W 10/20; B60W 2050/146; B60W 2300/36;
(Continued)

(56) References Cited

U.S. PATENT DOCUMENTS

2010/0259417 A1* 10/2010 Nieves .................... B60Q 9/00
340/901
2012/0253626 A1* 10/2012 Yamaguchi ............ B60K 28/16
701/85
(Continued)

FOREIGN PATENT DOCUMENTS

CN 103129653 6/2013
CN 103569134 A * 2/2014 ............. B60N 2/986
(Continued)

OTHER PUBLICATIONS

International Search Report and Written Opinion for International Application No. PCT/JP2021/038476 mailed on Nov. 22, 2021, 9 pages.
(Continued)

*Primary Examiner* — Babar Sarwar
(74) *Attorney, Agent, or Firm* — Amin, Turocy & Watson, LLP

(57) ABSTRACT

This vehicle information notification device includes: a pair of left and right grips which are formed on a steering handle; and a vibration device (which is disposed on at least one of the pair of left and right grips to notify a driver of predetermined information, wherein a plurality of the vibration devices are provided on one of the left and right grips. Both of the pair of left and right grips are respectively provided with a plurality of vibration devices.

9 Claims, 12 Drawing Sheets

(51) Int. Cl.
B60W 10/20 (2006.01)
B60W 50/14 (2020.01)
B62J 50/22 (2020.01)

(58) Field of Classification Search
CPC ......... B60W 50/14; B60W 50/16; B62D 1/14; B62J 27/00; B62J 45/41; B62J 50/22; B62J 6/24; B62K 21/10; B62K 21/26
See application file for complete search history.

(56) References Cited

U.S. PATENT DOCUMENTS

| | | | |
|---|---|---|---|
| 2013/0021144 A1* | 1/2013 | Hamachi | B62D 1/046 340/425.5 |
| 2016/0090037 A1* | 3/2016 | Tetsuka | B60Q 9/008 340/435 |
| 2017/0057354 A1* | 3/2017 | Nishihara | B60W 30/18172 |
| 2019/0185099 A1 | 6/2019 | Shirai | |
| 2020/0017164 A1 | 1/2020 | Saeki | |

FOREIGN PATENT DOCUMENTS

| | | |
|---|---|---|
| CN | 110001829 | 7/2019 |
| EP | 2599698 | 6/2013 |
| JP | 2013-244767 | 12/2013 |
| JP | 2014-203196 | 10/2014 |
| JP | 2016-068769 | 5/2016 |
| JP | 2017-044081 | 3/2017 |
| JP | 6181798 | 8/2017 |
| JP | 2018-181269 | 11/2018 |
| JP | 2020-006876 | 1/2020 |
| WO | 2011/125478 | 10/2011 |

OTHER PUBLICATIONS

Chinese Office Action for Chinese Patent Application No. 202180075871.8 mailed Jun. 14, 2025.

* cited by examiner

VEHICLE INFORMATION NOTIFICATION DEVICE

TECHNICAL FIELD

The present invention relates to a vehicle information notification device.

The present application claims priority based on Japanese Patent Application No. 2020-192290 filed on Nov. 19, 2020, the contents of which are incorporated herein by reference.

BACKGROUND ART

Conventionally, it is known that a tactile stimulus device provided on a rim of a steering wheel or the like gives information to a driver through the tactile sense during automatic driving of a vehicle (for example, see Patent Document 1).

RELATED ART DOCUMENT

Patent Document

Patent Document 1: Japanese Unexamined Patent Application, First Publication No. 2018-181269

SUMMARY

Problems to be Solved by the Invention

Since the above-described tactile information notification is performed on the part that the driver constantly touches while driving the vehicle compared to the visual information notification, it is possible to reliably notify the driver of information.

However, the amount of notification information is limited in a configuration that simply notifies only based on the presence or absence of tactile stimulation. Therefore, there is a demand for a configuration capable of notifying the driver of more information and increasing the types of information to be notified.

Here, an object of the present invention is to notify a driver of more information and to increase the types of information to be notified in a vehicle information notification device that notifies a driver of information by tactile sense.

Means for Solving the Problem

As a solution to the above problems, a vehicle information notification device of the present invention includes: a pair of left and right grips which are formed on a steering handle; and a vibration device which is disposed on at least one of the pair of left and right grips to notify a driver of predetermined information. A plurality of the vibration devices are provided on one of the left and right grips.

According to this configuration, the vibration device for notifying the driver of information is disposed on at least one of the pair of left and right grips of the steering handle. The plurality of vibration devices are provided on one of the left and right grips. Accordingly, it is possible to combine not only the presence or absence of vibration by the vibration device but also the difference in which of the plurality of vibration devices to be operated. Accordingly, it is possible to notify the driver of more information and to increase the types of information to be notified.

In addition, in the present invention, an operation intervention function is provided to intervene in an operation performed by the driver, and the vibration device is vibrated while being interlocked with the operation intervention function.

According to this configuration, the vibration device is vibrated while being interlocked with the operation intervention function for the driver's operation. Accordingly, it is possible to notify the driver of the operation of the operation intervention function by the vibration of the vibration device.

In addition, in the present invention, in a standby state in which a system of the operation intervention function is activated and the operation intervention function is not operated yet, the vibration device is vibrated as below. That is, the vibration device is vibrated in a vibration mode different from that when the operation intervention function is operated.

According to this configuration, the vibration device is vibrated in a vibration mode different from that when the operation intervention function is operated in the standby state in which only the system of the operation intervention function is activated. Accordingly, it is possible to notify the driver of the standby state in which the operation intervention function is operable.

In addition, in the present invention, the vibration device is vibrated intermittently at a predetermined first time interval in the standby state. The vibration device is vibrated intermittently at a second time interval shorter than the first time interval or is vibrated continuously without any time interval when the operation intervention function is operated.

According to this configuration, the vibration device is vibrated at a time interval shorter than the time interval in the standby state during the operation of the operation intervention function. Accordingly, it is possible to notify the driver that the operation intervention function has been transitioned from the standby state to the operation state.

In the present invention, both of the pair of left and right grips may be respectively provided with a plurality of vibration devices.

According to this configuration, since the plurality of vibration devices are provided on each of the pair of left and right grips, it is also possible to combine the difference in which of the left and right grips is to be vibrated. Accordingly, it is possible to further notify the driver of more information and to further increase the types of information to be notified.

In the present invention, at least one of a steering intervention function and a braking intervention function may be provided as the operation intervention function.

According to this configuration, at least one of the steering intervention function and the braking intervention function in the operation intervention function is operated. Accordingly, it is possible to notify the driver by the vibration of the vibration device.

In the present invention, the plurality of vibration devices provided on one of the left and right grips may be arranged side by side in an axial direction which is elongated in a vehicle width direction of the grip. The vibration device which is disposed on an outside of the grip in the vehicle width direction in the plurality of vibration devices may be vibrated while being interlocked with the steering intervention function.

According to this configuration, the vibration of the vibration device disposed on the outside of the grip in the vehicle width direction in the plurality of vibration devices is interlocked with the steering intervention function. Accordingly, the steering direction by the steering intervention function can be notified by the vibration of the vibration device disposed on the outside of the grip in the vehicle width direction to be easily understood.

In the present invention, the plurality of vibration devices provided on one of the left and right grips may be arranged side by side in the axial direction which is elongated in the vehicle width direction of the grip. The vibration device which is disposed on an inside of the grip in the vehicle width direction in the plurality of vibration devices may be vibrated while being interlocked with the braking intervention function.

According to this configuration, the vibration of the vibration device disposed on the inside of the grip in the vehicle width direction in the plurality of vibration devices is interlocked with the braking intervention function. Accordingly, the operation of the braking intervention function can be notified by the vibration of the vibration device disposed on the inside of the grip in the vehicle width direction to be easily understood.

In the present invention, the vibration device may be vibrated at a frequency higher than a frequency of the standby state when the operation intervention function is operated.

According to this configuration, when the operation intervention function is operated, the vibration device is vibrated at a frequency higher than that in the standby state. Accordingly, it is possible to notify the driver that the operation intervention function has been transitioned from the standby state to the operation state.

In the present invention, the vibration device may start vibrating at a timing earlier than a timing of starting the operation of the operation intervention function when the operation intervention function is operated.

According to this configuration, the vibration device starts vibrating at a timing earlier than the start of the operation of the operation intervention function. Accordingly, it is possible to notify the driver of the start of the operation of the operation intervention function in advance.

In the present invention, a display device which displays predetermined information for the driver while being interlocked with a vibration of the vibration device may be provided.

According to this configuration, the display device which is interlocked with the vibration of the vibration device is further provided. Accordingly, it is possible to more reliably notify the driver of information by the vibration of the vibration device and the display of the display device.

Advantage of the Invention

According to the present invention, in the vehicle information notification device that notifies the driver of information by tactile sense, it is possible to notify the driver of more information and to increase the types of information to be notified.

DESCRIPTION OF THE EMBODIMENTS

Figure 1:
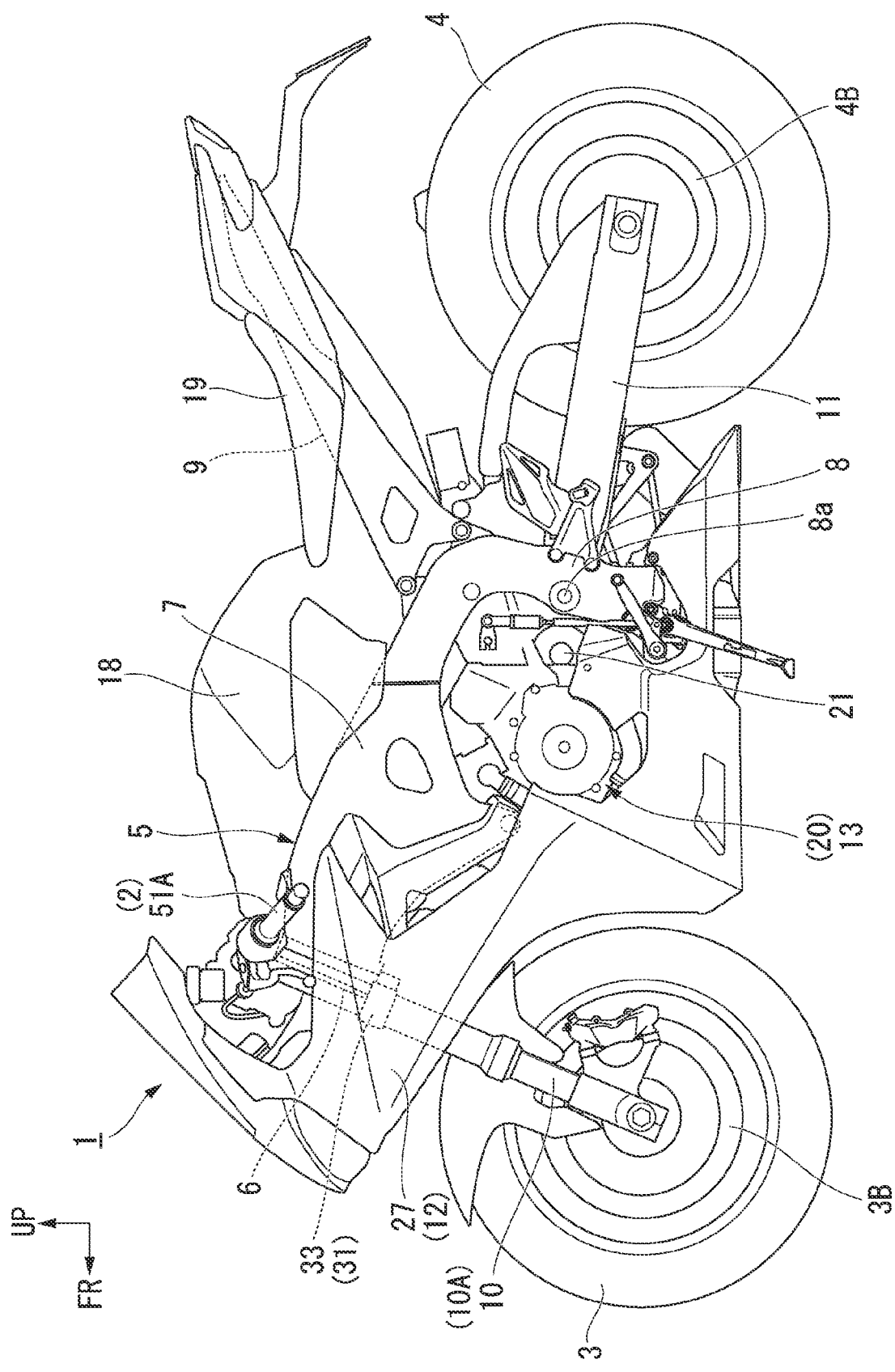
FIG. 1 is a left side view of a motorcycle of an embodiment of the present invention.

Hereinafter, an embodiment of the present invention will be described with reference to the drawings. In the following description, directions such as front, rear, left, and right are the same as the directions of the vehicle described below unless otherwise specified. An arrow FR indicating the front of the vehicle, an arrow LH indicating the left of the vehicle, and an arrow UP indicating the upper side of the vehicle are shown at appropriate locations in the drawings used in the following description.

<Whole Vehicle>

FIG. 1 shows a motorcycle 1 as an example of a vehicle of the embodiment. The motorcycle 1 includes a front wheel (steered wheel) 3 which is steered by a handle 2 and a rear wheel (driving wheel) 4 which is driven by a power unit 20. The motorcycle 1 is a saddle type vehicle in which a driver straddles a vehicle body. The motorcycle 1 is able to swing (bank) the vehicle body in the left and right direction (roll direction) based on ground contact points of the front and rear wheels 3 and 4. The vehicle of the embodiment is not limited to a vehicle that turns in a direction of banking a vehicle body like a motorcycle. The vehicle of the embodiment includes a vehicle that turns by steering a steered wheel without banking the vehicle body.

The motorcycle 1 includes a steering system component 10A having a handle 2 and a front wheel 3. The steering system component 10A is supported by a head pipe 6 to be steerable. The head pipe 6 is located at a front end portion of a vehicle body frame 5 that forms the skeleton of the motorcycle 1. The front wheel 3 is supported by lower end portions of a pair of left and right front forks 10 of the steering system component 10A. The vehicle body frame 5 is surrounded by a vehicle body cover 12.

The vehicle body frame 5 includes the head pipe 6, a pair of left and right main frames 7, a pair of left and right pivot frames 8, and a pair of left and right seat frames 9.

The head pipe 6 steerably supports the steering system component 10A. The left and right main frames 7 extend rearwardly downward from the head pipe 6. The left and right pivot frames 8 extend downward from the rear end portions of the left and right main frames 7 respectively. The left and right seat frames 9 extend rearwardly upward from the respective upper portions of the left and right pivot frames 8.

A pivot shaft 8a extending in the vehicle width direction is provided between the left and right pivot frames 8. The front end portion of the swing arm 11 is supported by the left and right pivot frames 8 through the pivot shaft 8a to swing up and down. The rear wheel 4 is supported by the rear end portion of the swing arm 11. A cushion unit (not shown) serving as a shock absorber is provided between the vehicle body frame 5 and the swing arm 11.

A fuel tank 18 is supported by the upper portions of the left and right main frames 7. A seat 19 is supported behind the fuel tank 18 by the left and right seat frames 9.

The power unit 20 of the motorcycle 1 is supported by the left and right main frames 7 and the left and right pivot frames 8. An output shaft of the power unit 20 is connected to the rear wheel 4 through a chain transmission mechanism (not shown) so that power can be transmitted.

The power unit 20 integrally includes an engine (internal combustion engine) 13 as a prime mover and a transmission 21 connected to the rear of the engine 13.

The motorcycle 1 includes a front wheel brake 3B which brakes the front wheel 3 and a rear wheel brake 4B which brakes the rear wheel 4. Each of the front wheel brake 3B and the rear wheel brake 4B is a disc brake.

The front wheel brake 3B and the rear wheel brake 4B appropriately brake the rotation of the front wheel 3 and the rear wheel 4 by operating a brake lever 43 (see FIG. 2) and a brake pedal (not shown) which are brake operators. Further, the front wheel brake 3B and the rear wheel brake 4B appropriately brake the rotation of the front wheel 3 and the rear wheel 4 by operating a brake actuator 102 (see FIG. 4) which will be described later.

The motorcycle 1 includes a driving assistance device 70 (see FIG. 4) that assists the driver's driving operation (in the embodiment, the steering operation for steering the front wheel 3 and the braking operation for braking the front wheel 3 and the rear wheel 4). The driving assistance device 70 includes a control device 71 that controls a function of automatically intervening in the driver's driving operation (automatic operation intervention function). The automatic operation intervention function includes an automatic steering intervention function and an automatic braking intervention function. The driving assistance device 70 will be described later.

Figure 2:
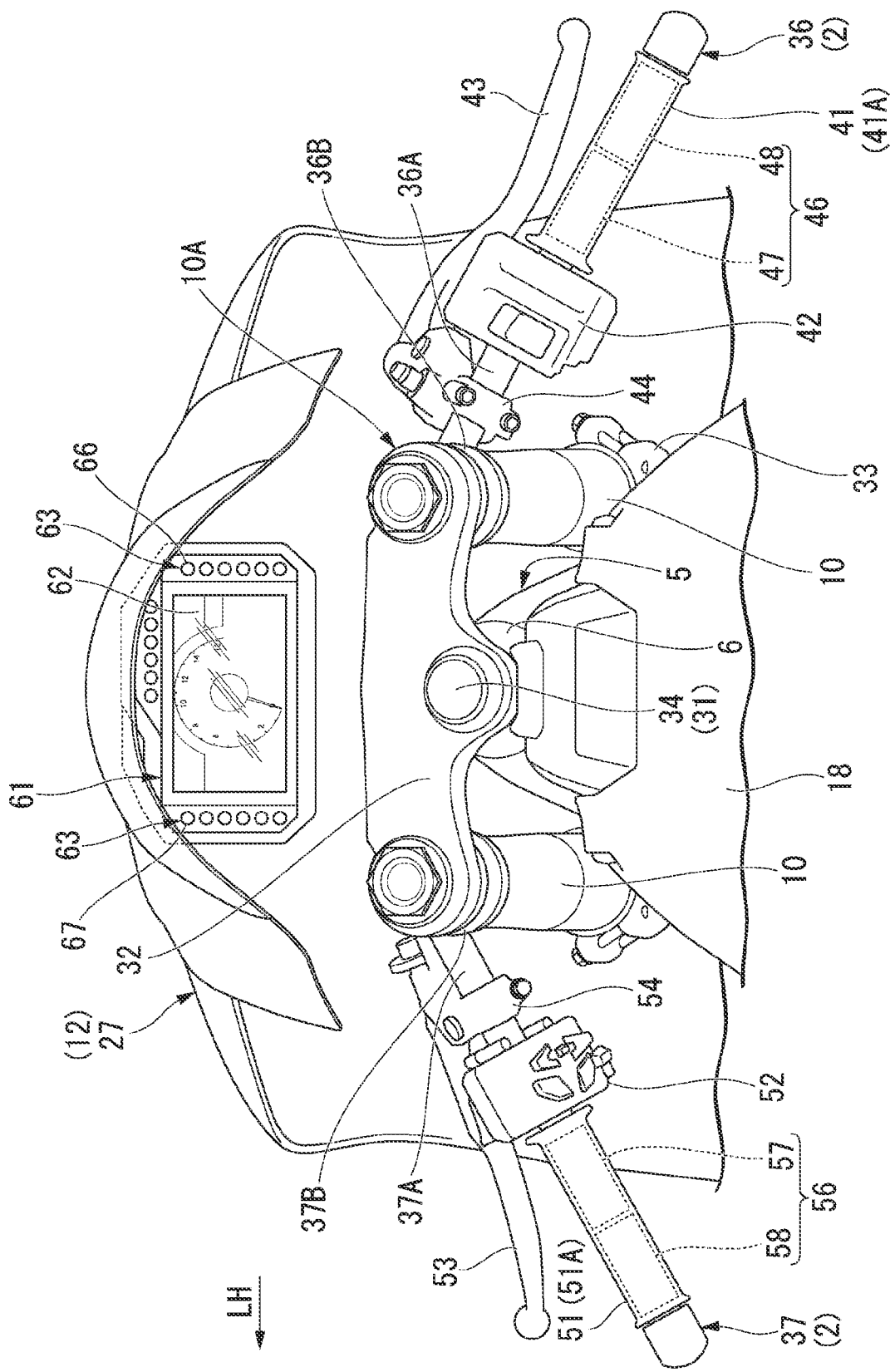
FIG. 2 is a perspective view of the periphery of a handle of the motorcycle when viewed from a driver's line of sight.

FIG. 2 shows the periphery of the handle 2 at the front part of the vehicle body when viewed from the driver's line of sight. The upper portions of the left and right front forks 10 are supported by the head pipe 6 through a steering stem 31. The left and right front forks 10 are telescopic shock absorbers. The steering stem 31 includes a top bridge 32 and a bottom bridge 33 which connect the upper portions of the left and right front forks 10 and a stem shaft (steering shaft) 34 which is inserted through the head pipe 6. The front part of the vehicle body is covered with a front cowl 27 of the vehicle body cover 12.

For example, the handle 2 of the motorcycle 1 is separate left and right handles, and includes a pair of left and right handles 36 and 37. For example, the right handle 36 and the left handle 37 are attached to the upper portions of the left and right front forks 10 below the top bridge 32, respectively.

The right handle 36 includes a right grip 41A which is gripped by the driver with his/her right hand. The right grip 41A includes a cylindrical right grip bar 36A which has a length in the vehicle width direction and extends linearly and an accelerator sleeve 41 which is externally fitted to the right grip bar 36A to be rotatable around its axis. The right grip bar 36A is made of a metal pipe or the like. The accelerator sleeve 41 is configured by fixing a rubber grip on the outer periphery of a synthetic resin body.

The right grip bar 36A extends inward in the vehicle width direction from the accelerator sleeve 41 and supports a right switch box 42 and a right lever holder 44. Reference numeral 43 in the drawing denotes a right lever (for example, a front brake lever) that is swingably supported by the right lever holder 44. An end portion of the right grip bar 36A on the inside in the vehicle width direction is fixed to the upper portion of the right front fork 10 through a right handle clamp 36B.

The right grip 41A includes a right actuator 46 for giving vibration as information notification to the driver's right hand. The right actuator 46 is provided on at least one of the right grip bar 36A and the accelerator sleeve 41. The right actuator 46 includes a right inner actuator (vibration device) 47 which is disposed on the inside of the right grip 41A in the vehicle width direction and a right outer actuator (vibration device) 48 which is disposed on the outside of the right grip 41A in the vehicle width direction. The right inner actuator 47 and the right outer actuator 48 are arranged side by side in the axial direction which is elongated in the vehicle width direction of the right grip 41A. For example, the right inner actuator 47 and the right outer actuator 48 are composed of piezoelectric elements or vibrators of other structures.

The left handle 37 includes a left grip 51A which is gripped by the driver's left hand. The left grip 51A includes a cylindrical left grip bar 37A which has a length in the vehicle width direction and extends linearly and a handle grip 51 which is fixedly attached to the left grip bar 37A. The left grip bar 37A is made of a metal pipe or the like. The handle grip 51 is a rubber grip made of synthetic resin.

The left grip bar 37A extends inward in the vehicle width direction from the handle grip 51 and supports a left switch box 52 and a left lever holder 54. Reference numeral 53 in the drawing denotes a left lever (for example, a clutch lever). An end portion of the left grip bar 37A on the inside of the vehicle width direction is fixed to the upper portion of the left front fork 10 through a left handle clamp 37B.

The left grip 51A includes a left actuator 56 for giving vibration as information notification to the driver's left hand. The left actuator 56 is provided on at least one of the left grip bar 37A and the handle grip 51. The left actuator 56 includes a left inner actuator (vibration device) 57 which is disposed on the inside of the left grip 51A in the vehicle width direction and a left outer actuator (vibration device) 58 which is disposed on the outside of the left grip 51A in the vehicle width direction. The left inner actuator 57 and the left outer actuator 58 are arranged side by side in the axial direction which is elongated in the vehicle width direction of the left grip 51A. For example, the left inner actuator 57 and the left outer actuator 58 are composed of piezoelectric elements or vibrators of other structures similarly to the right inner actuator 47 and the right outer actuator 48.

A meter device 61 is disposed in front of the front fork 10. The meter device 61 is supported by the vehicle body frame 5 or the front cowl 27. The meter device 61 includes a display screen 62 such as a liquid crystal display which displays images of a vehicle speed and an engine rotation speed and an indicator lamp group 63 which is arranged around the display screen 62 and notifies various information.

The indicator lamp group 63 includes a right indicator lamp (display device) 66 which is disposed on the right side of the display screen 62 and a left indicator lamp (display device) 67 which is disposed on the left side of the display screen 62. The right indicator lamp 66 emits light while being interlocked with the operation of the right inner actuator 47 and the right outer actuator 48. The left indicator lamp 67 emits light while being interlocked with the operation of the left inner actuator 57 and the left outer actuator 58. The display screen 62 notifies the driver of predetermined information by displaying a predetermined image. The indicator lamp group 63 notifies the driver of predetermined information by performing predetermined light-emitting display (lighting or blinking).

Figure 3:
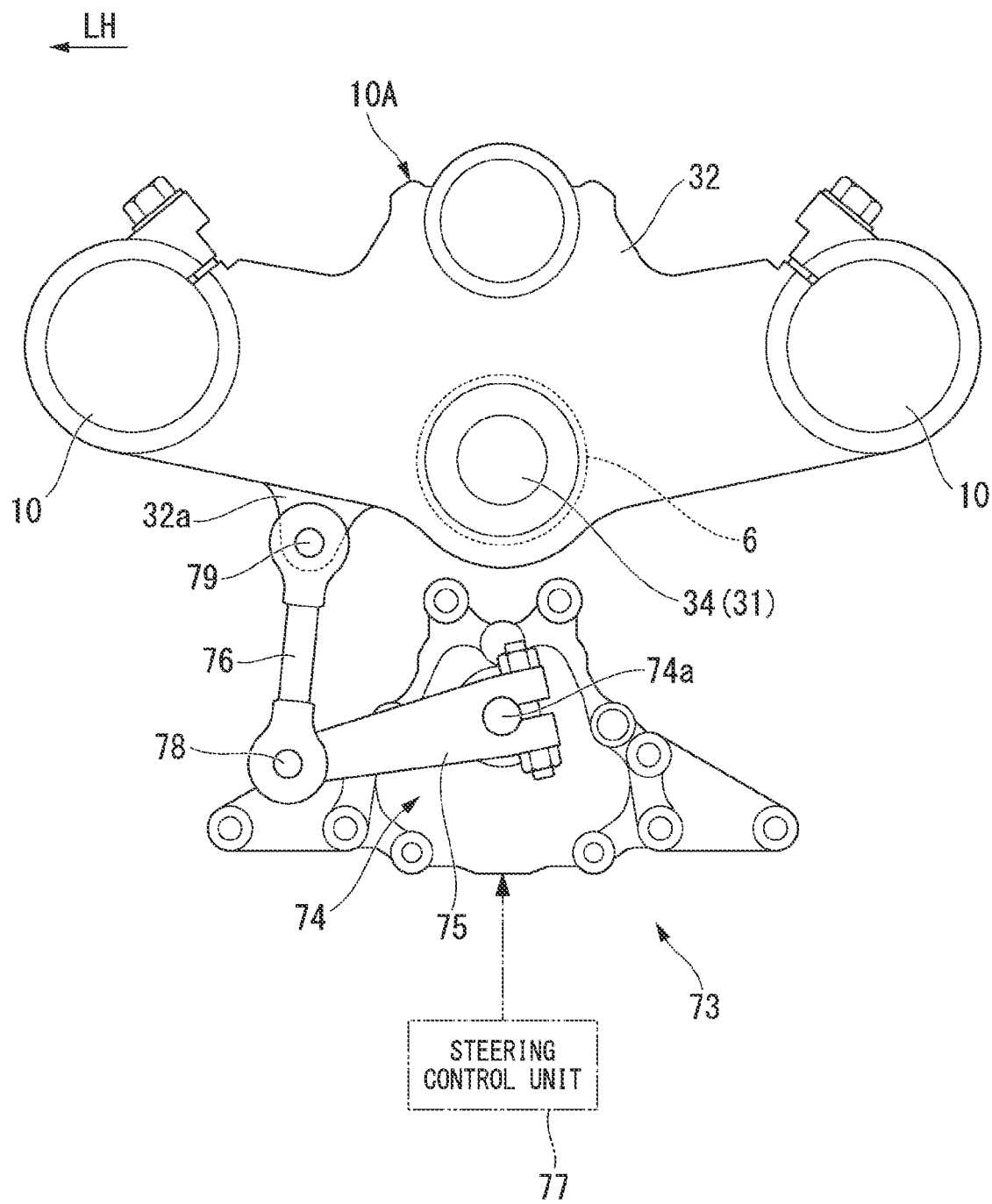
FIG. 3 is an explanatory diagram of a steering actuator of the motorcycle.

FIG. 3 shows the periphery of the top bridge 32 when viewed from above in the axial direction of the stem shaft 34.

A steering input is automatically applied to the steering system component 10A by a steering assist device 73 separately from the operation of the handle 2 by the driver.

The steering assist device 73 includes a steering actuator 74, an arm 75, a connecting rod 76, and a steering control unit 77.

The steering actuator 74 includes an electric motor which is a drive source of the automatic steering intervention function. The steering actuator 74 is fixed to, for example, the vehicle body frame 5. A base end portion of the arm 75 is fixed to a drive shaft 74a which is an output shaft of the steering actuator 74 to be rotatable together. One end portion of the connecting rod 76 is swingably connected to the tip portion of the arm 75 through a first connecting pin 78. The other end portion of the connecting rod 76 is swingably connected to a rod connecting portion 32a provided on the top bridge 32 through a second connecting pin 79.

The operation of the steering actuator 74 is controlled by the steering control unit 77. The output of the steering actuator 74 (the rotation torque of the drive shaft 74a) is transmitted to the top bridge 32 through the arm 75 and the connecting rod 76. Accordingly, the steering actuator 74 generates a steering torque (assist torque) in the steering system component 10A.

<Driving Assistance Device>

Figure 4:
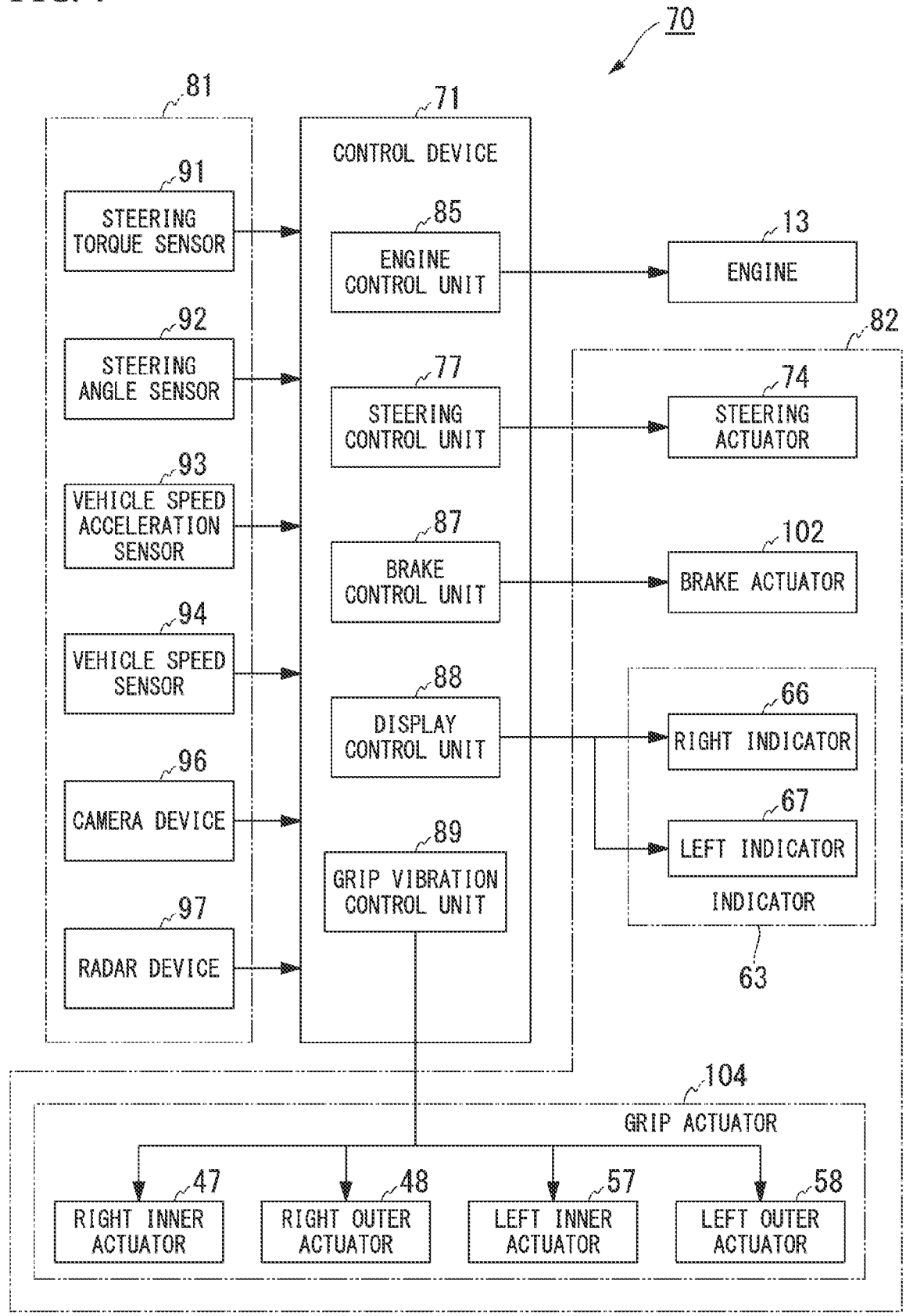
FIG. 4 is a block diagram of a driving assistance device of the motorcycle.

As shown in FIG. 4, the driving assistance device 70 includes a control device 71, various sensors 81, and various devices 82. The control device 71 controls the operation of various devices 82 based on the detection information acquired from various sensors 81.

The control device 71 is composed of, for example, a single or a plurality of Electronic Control Units (ECUs). At least a part of the control device 71 may be realized by cooperation of software and hardware.

The control device 71 includes an engine control unit 85, a steering control unit 77, a brake control unit 87, a display control unit 88, and a grip vibration control unit 89.

Various sensors 81 include a steering torque sensor 91, a steering angle sensor 92, a vehicle body acceleration sensor 93, a vehicle speed sensor 94, a camera device 96, and a radar device 97.

The steering torque sensor 91 is, for example, a magnetostrictive torque sensor provided between the handle 2 and the steering system component 10A other than the handle 2. The steering torque sensor 91 detects a torsional torque (steering input) input from the handle 2 to the other steering system components 10A.

The steering angle sensor 92 is, for example, a potentiometer provided on the steering shaft (stem shaft 34). The steering angle sensor 92 detects the turning angle (steering angle) of the steering shaft with respect to the vehicle body.

The vehicle body acceleration sensor 93 is a 5-axis or 6-axis Inertial Measurement Unit (IMU). The vehicle body acceleration sensor 93 detects the angular velocities of the three axes (roll axis, pitch axis, and yaw axis) of the vehicle body and further can estimate the angle and acceleration from the results.

The vehicle speed sensor 94 detects, for example, the rotation speed of the output shaft of the power unit 20. The vehicle speed sensor 94 can detect the rotation speed of the rear wheel 4 and further the vehicle speed of the motorcycle 1 from the rotation speed.

The camera device 96 includes a camera using a solid-state imaging device such as CCD or CMOS. The camera device 96, for example, periodically photographs the surroundings of the motorcycle 1 (for example, front, rear, left, and right) using the camera. The camera device 96 generates image data from the captured image through image processing such as filtering and binarization.

The radar device 97 radiates radio waves such as millimeter waves around the motorcycle 1. The radar device 97 detects radio waves (reflected waves) reflected by an object around the vehicle. The radar device 97 can detect at least the front, rear, left, and right positions of the object with respect to the motorcycle 1 (distance and orientation with respect to the motorcycle 1) and the speed.

Information from the camera device 96 and the radar device 97 described above is used to recognize the position, type, speed, and the like of an object in the detection direction. Based on this recognition, driving assistance control, automatic driving control, and the like of the motorcycle 1 are performed.

Various devices 82 include the steering actuator 74, the brake actuator 102, the indicator lamp group 63, and a grip actuator 104.

The steering actuator 74 generates a steering torque for steering the front wheel 3 independently of the operation of the handle 2 by the driver. The steering actuator 74 may also serve as a steering damper.

The brake actuator 102 operates the front wheel brake 3B and the rear wheel brake 4B by supplying a hydraulic pressure to the front wheel brake 3B and the rear wheel brake 4B separately from the operation of the brake operator by the driver. The brake actuator 102 may also serve as an Anti-lock Brake System (ABS) control unit. The brake actuator 102 may be connected to a brake line branched from the normal brake circuit.

The indicator lamp group 63 includes a right indicator lamp 66 and a left indicator lamp 67. The right indicator lamp 66 and the left indicator lamp 67 emit light while being interlocked with the operation of the grip actuator 104.

The grip actuator 104 includes the right inner actuator 47, the right outer actuator 48, the left inner actuator 57, and the left outer actuator 58. In the embodiment, the right inner actuator 47 and the left inner actuator 57 are set to have vibration frequencies lower than those of the right outer actuator 48 and the left outer actuator 58. Additionally, the vibration frequency of each of the actuators 47, 48, 57, and 58 may be variable.

Next, the control device 71 will be described.

The engine control unit 85 controls the output of the engine 13 based on the throttle opening, intake negative pressure, fuel injection amount, valve timing, ignition timing, and the like in the engine 13. Further, the vehicle speed of the motorcycle 1 is changed according to the crankshaft rotation speed of the engine 13 and the gear ratio of the transmission 21 by controlling the output of the engine 13.

The steering control unit 77 controls the operation of the steering actuator 74 based on the following signals and information. The signals and information are the steering torque signal detected by the steering torque sensor 91, the angular velocity signal detected by the vehicle body acceleration sensor 93, the vehicle speed signal detected by the vehicle speed sensor 94, the detection information detected by the camera device 96 and the radar device 97, and the like. Accordingly, the assist torque is applied to the steering system component 10A. By this assist torque, the steering of the front wheel 3 which is a steered wheel is assisted. In this way, the steering control unit 77 controls the automatic steering intervention function.

The brake control unit 87 controls the operation of the brake actuator 102 based on the engine output, the vehicle speed signal detected by the vehicle speed sensor 94, the detection information detected by the camera device 96 and the radar device 97, and the like. Accordingly, the front wheel brake 3B and the rear wheel brake 4B generate an assist braking force. By this assist braking force, the braking of the front wheel 3 and the rear wheel 4 is assisted. In this way, the brake control unit 87 controls the automatic braking intervention function.

The display control unit 88 controls the light emission (lighting or blinking) of the right indicator lamp 66 and the left indicator lamp 67 in accordance with the control of the following functions. The above-described function control includes the control of the automatic steering intervention function by the steering control unit 77 and the control of the automatic braking intervention function by the brake control unit 87.

The grip vibration control unit 89 controls the operations of the right inner actuator 47, the right outer actuator 48, the left inner actuator 57, and the left outer actuator 58 in accordance with the control of the following functions. The above-described function control includes the control of the automatic steering intervention function by the steering control unit 77 and the control of the automatic braking intervention function by the brake control unit 87.

The display control unit 88 and the grip vibration control unit 89 are synchronously controlled when the steering actuator 74 and the brake actuator 102 are operated.

The engine control unit 85, the steering control unit 77, the brake control unit 87, the display control unit 88, and the grip vibration control unit 89 described above all include microcomputers and are configured to communicate with each other.

The operation of the driving assistance device 70 described above will be described.

Figure 5:
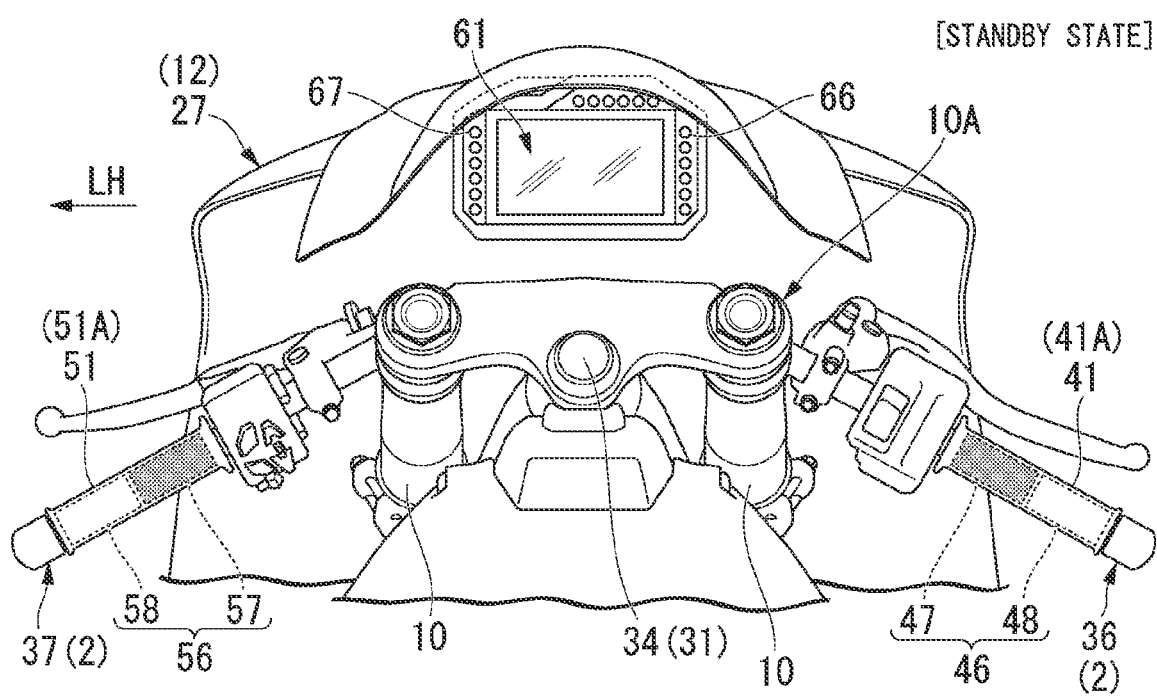
FIG. 5 is an explanatory diagram of an operation of the driving assistance device in a standby state.

FIG. 5 shows a standby state in which the system of the driving assistance device 70 is activated and the automatic operation intervention function is not operated yet. In the standby state, the main switch (power supply) of the motorcycle 1 is turned on and the operation switch of the driving assistance device 70 is turned on so that the operation of the automatic operation intervention function is allowed. In the standby state, various sensors 81 monitor various parameters and the like for operating the automatic operation intervention function. Based on this monitoring information, the automatic operation intervention function can be operated immediately.

In the standby state, the right inner actuator 47 of the right grip 41A and the left inner actuator 57 of the left grip 51A are vibrated in a predetermined mode. Accordingly, this notifies the driver that the system is activated. Additionally, FIG. 5 and FIGS. 7, 9, and 11 below show that those which are operated (vibrated) are shaded among the right inner actuator 47, the right outer actuator 48, the left inner actuator 57, the left outer actuator 58.

Figure 6:
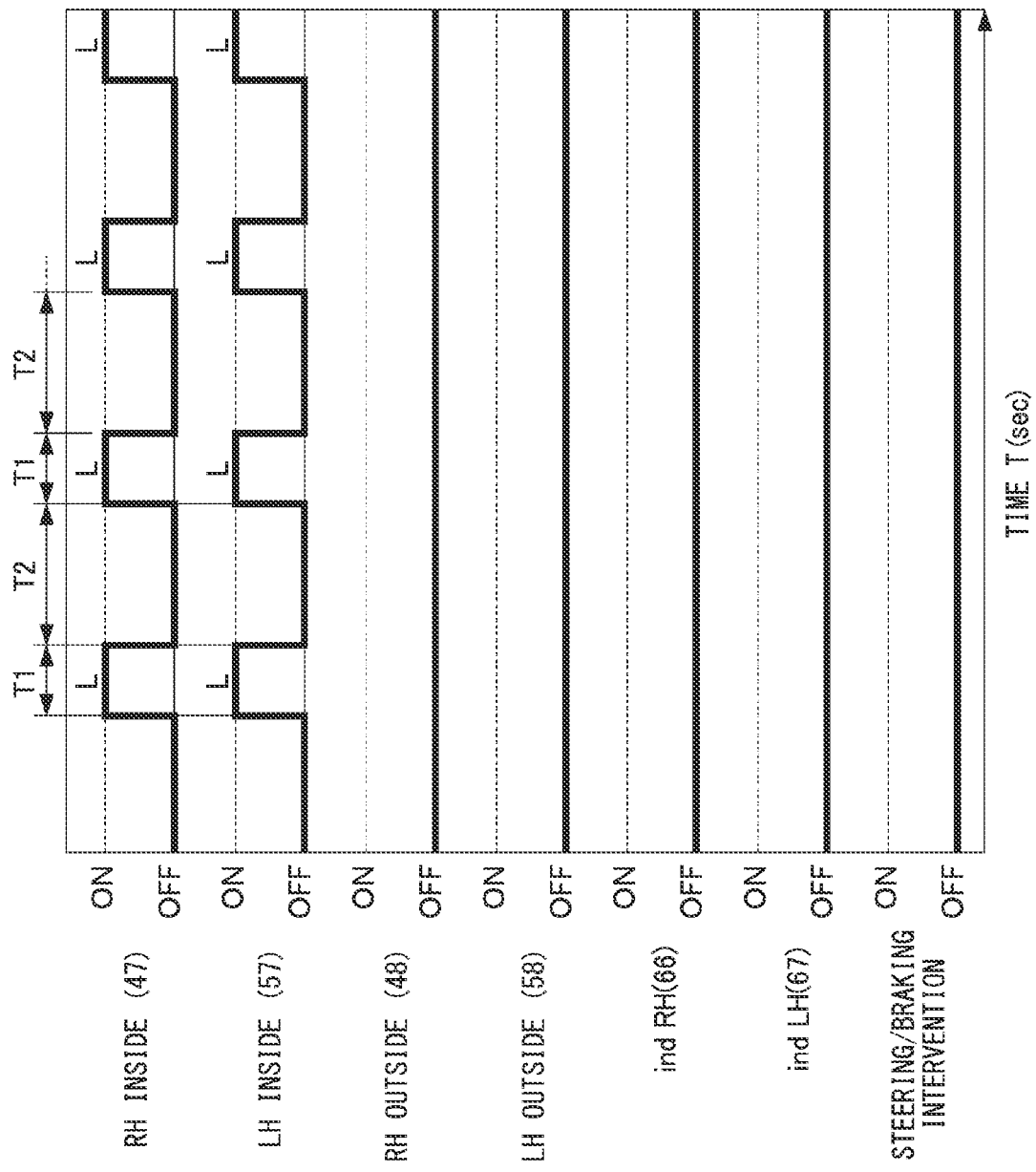
FIG. 6 is a graph showing temporal changes in the operation of various devices in the standby state of the driving assistance device.

FIG. 6 shows the operation of the grip actuator 104 and the like in the standby state as time goes by.

The vertical axis of the graph of FIG. 6 indicates the operation state (ON (operation) and OFF (non-operation)) of the actuators 47, 48, 57, and 58 of the left and right grips 41A and 51A together with the left and right indicator lamps 66 and 67. The vertical axis further indicates the operation state (ON and OFF) of the steering intervention or the braking intervention. The horizontal axis of the graph indicates the time T (sec).

In the drawing, "RH inside" indicates the right inner actuator 47, "LH inside" indicates the left inner actuator 57, "RH outside" indicates the right outer actuator 48, and "LH outside" indicates the left outer actuator 58. Further, "indRH" indicates the right indicator lamp 66 and "indLH" indicates the left indicator lamp 67. Additionally, even in the graphs of FIGS. 8, 10, and 12, the vertical axis and the horizontal axis are the same as those of the graph shown in FIG. 6.

In the above-described standby state, the right inner actuator 47 and the left inner actuator 57 are vibrated intermittently at the same timing. In the standby state, the right inner actuator 47 and the left inner actuator 57 are simultaneously vibrated for a predetermined time T1 (for example, 0.5 to 1 second). Further, the right inner actuator 47 and the left inner actuator 57 repeat the vibration of the time T1 at the time interval of a predetermined time T2 (for example, about 2 seconds). In the standby state, the right inner actuator 47 and the left inner actuator 57 are vibrated intermittently at a predetermined low frequency L.

Figure 7:
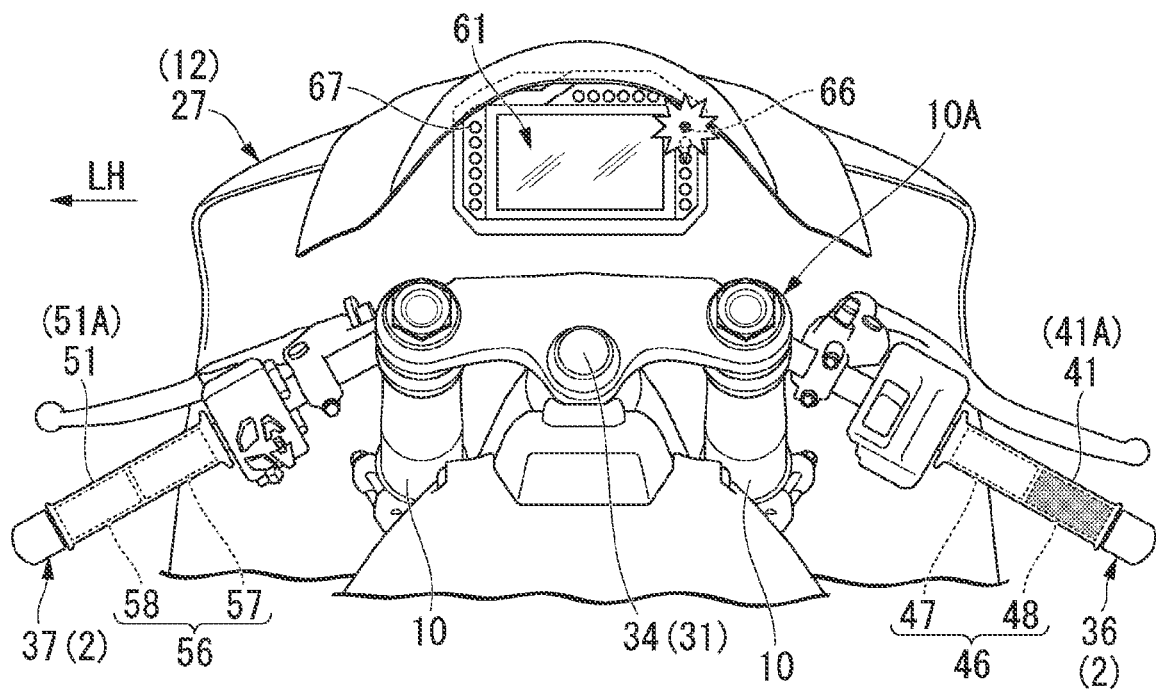
FIG. 7 is an explanatory diagram of the operation when a right steering intervention of the driving assistance device is operated.

FIG. 7 shows a state in which the driving assistance device 70 operates the automatic steering intervention function from the standby state and is about to turn the course of the motorcycle 1 to the right side.

For example, when the steering control unit 77 of the driving assistance device 70 determines that the motorcycle 1 has moved too far to the left side of the lane, the steering control unit 77 tries to return the course of the motorcycle 1 to the right side.

At this time, the steering control unit 77 steers the front wheel 3 to the left side by the steering actuator 74. That is, the front wheel 3 is steered in the opposite direction to the side on which the course of the motorcycle 1 is to be changed (reverse steering). Accordingly, the vehicle body of the motorcycle 1 rolls toward the side where the course is to be changed. As a result, the motorcycle 1 can be naturally steered in the course change direction.

In the case of the vehicle that turns by steering the steered wheel without banking the vehicle body, the steered wheel is not steered in the opposite direction, but is steered forward in the course change direction.

When the above-described automatic steering intervention function is operated, only the right outer actuator 48 of the right grip 41A in the course change direction (right side) of the motorcycle 1 is vibrated in a vibration mode different from that in the standby state. Further, the right indicator lamp 66 of the meter device 61 starts blinking.

Accordingly, the driver can recognize the following points through the tactile sense of the hands holding the left and right grips 41A and 51A and the visual sense. That is, the driver can recognize the operation of the automatic steering intervention function and the moving direction of the motorcycle 1.

Figure 8:
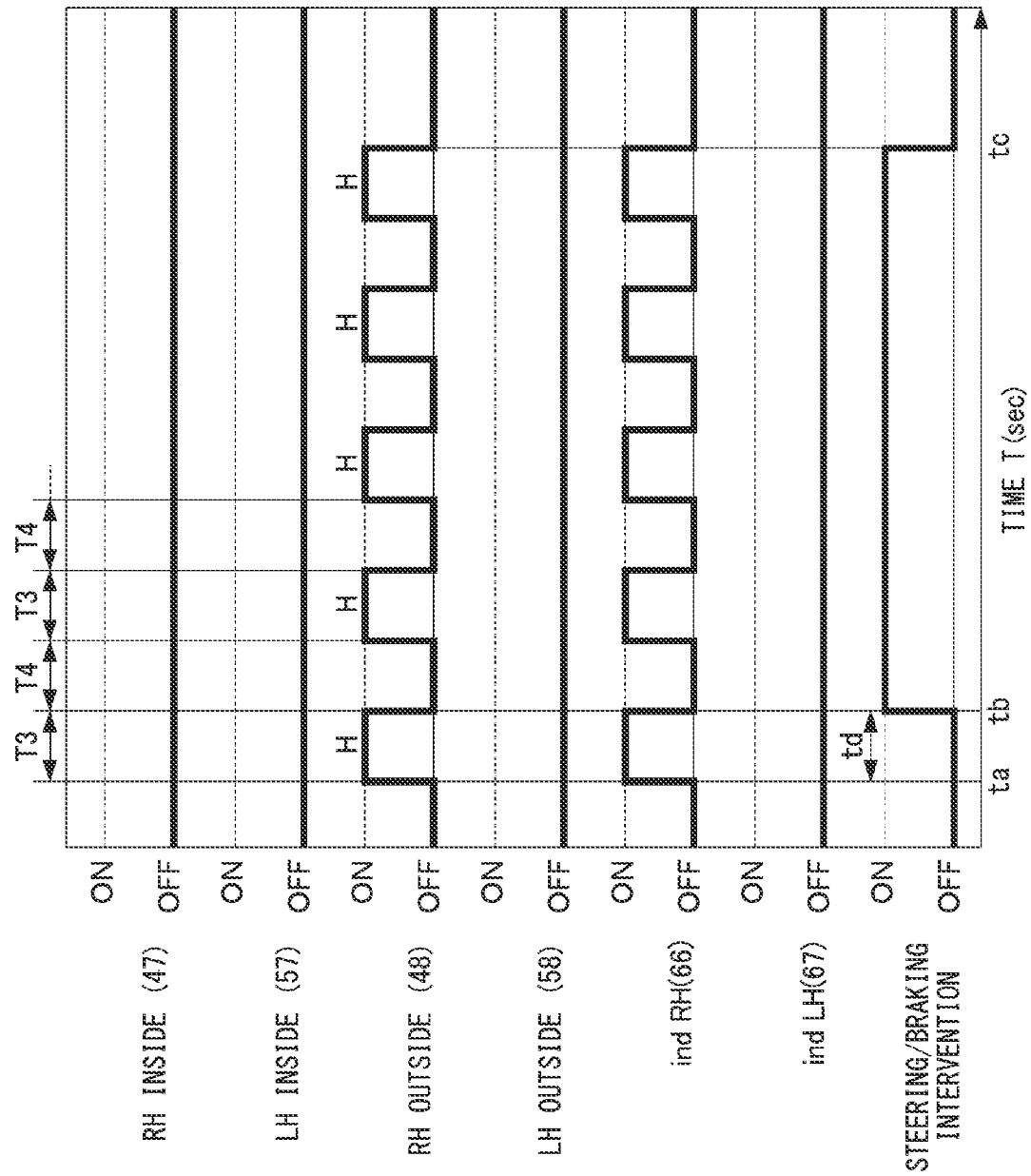
FIG. 8 is a graph showing temporal changes in the operation of various devices when the right steering intervention of the driving assistance device is operated.

FIG. 8 shows the operation mode of each of the actuators 47, 48, 57, and 58 during the operation of the automatic steering intervention function shown in FIG. 7.

During the operation of the automatic steering intervention function shown in FIG. 7, only the right outer actuator 48 of the right grip 41A starts vibrating for a predetermined time T3 (for example, 0.5 to 1 second). Further, the right outer actuator 48 repeats the vibration of the time T3 at the time interval of a predetermined time T4 (for example, 0.5 to 1 second). The time T4 is shorter than the time T2 in the standby state. The time T3 may be equal to or shorter than the time T1 in the standby state.

That is, the right outer actuator 48 is vibrated intermittently at a period (T3+T4) shorter than a period (T1+T2) in the standby state during the above-described operation.

Further, the right outer actuator 48 is vibrated intermittently at a predetermined high frequency H during the above-described operation. The frequency of the high frequency H is higher than that of the low frequency L in the standby state.

The vibration frequencies L and H when the actuators 47, 48, 57, and 58 are vibrated are set in the following frequency band. That is, the vibration frequencies L and H are set in a frequency band that avoids vibration frequencies unique to the motorcycle 1 such as engine vibration and wheel vibration. Accordingly, the vibration of each of the actuators 47, 48, 57, and 58 is difficult to be confused with other vibrations. As a result, it becomes easier for the driver to perceive the vibrations of the actuators 47, 48, 57, and 58.

When the right outer actuator 48 is vibrated during the above-described operation, the following operations occur. That is, the right indicator lamp 66 emits light (blinks) while being interlocked (synchronized) with the vibration of the right outer actuator 48. Additionally, the right indicator lamp 66 may blink in a period having a phase with respect to the vibration period of the right outer actuator 48 or may blink in a different period.

Here, a timing ta at which the right outer actuator 48 starts vibrating and the right indicator lamp 66 starts blinking is set as follows. That is, the timing ta is earlier than a timing tb at which the automatic steering intervention function starts operating by a time td (for example, about 1 second). That is, the vibrating of the right outer actuator 48 and the blinking of the right indicator lamp 66 start before the operation of the automatic steering intervention function. Accordingly, it is possible to notify the driver of the start of the operation of the automatic steering intervention function in advance.

Additionally, the vibrating of the right outer actuator 48 and the blinking of the right indicator lamp 66 stop simultaneously at a timing tc when the operation of the automatic steering intervention function stops.

Figure 9:
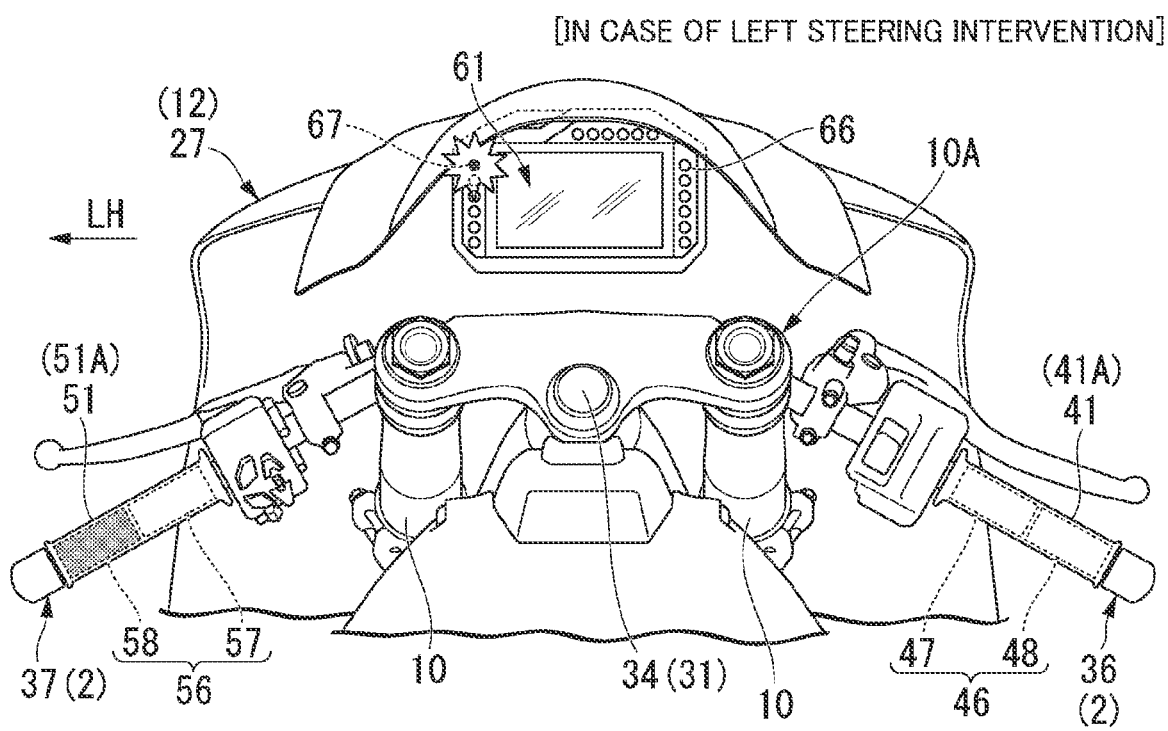
FIG. 9 is an explanatory diagram of the operation when a left steering intervention of the driving assistance device is operated.

FIG. 9 shows a state in which the driving assistance device 70 operates the automatic steering intervention function from the standby state and is about to turn the course of the motorcycle 1 to the left side.

For example, when the steering control unit 77 of the driving assistance device 70 determines that the motorcycle 1 has moved too far to the right side of the lane, the steering control unit 77 tries to return the course of the motorcycle 1 to the left side.

At this time, the steering control unit 77 steers the front wheel 3 to the right side by the steering actuator 74. That is, the front wheel 3 is steered in the opposite direction to the side on which the course of the motorcycle 1 is to be changed (reverse steering). Accordingly, the motorcycle 1 can be naturally steered in the course change direction.

During the operation of the automatic steering intervention function, only the left outer actuator 58 of the left grip 41A in the course changing direction (left side) of the motorcycle 1 is vibrated in a vibration mode different from that in the standby state. Further, the left indicator lamp 67 of the meter device 61 starts blinking.

Accordingly, the driver can recognize the following points through the tactile sense of the hands holding the left and right grips 41A and 51A and the visual sense. That is, the driver can recognize the operation of the automatic steering intervention function and the moving direction of the motorcycle 1.

Figure 10:
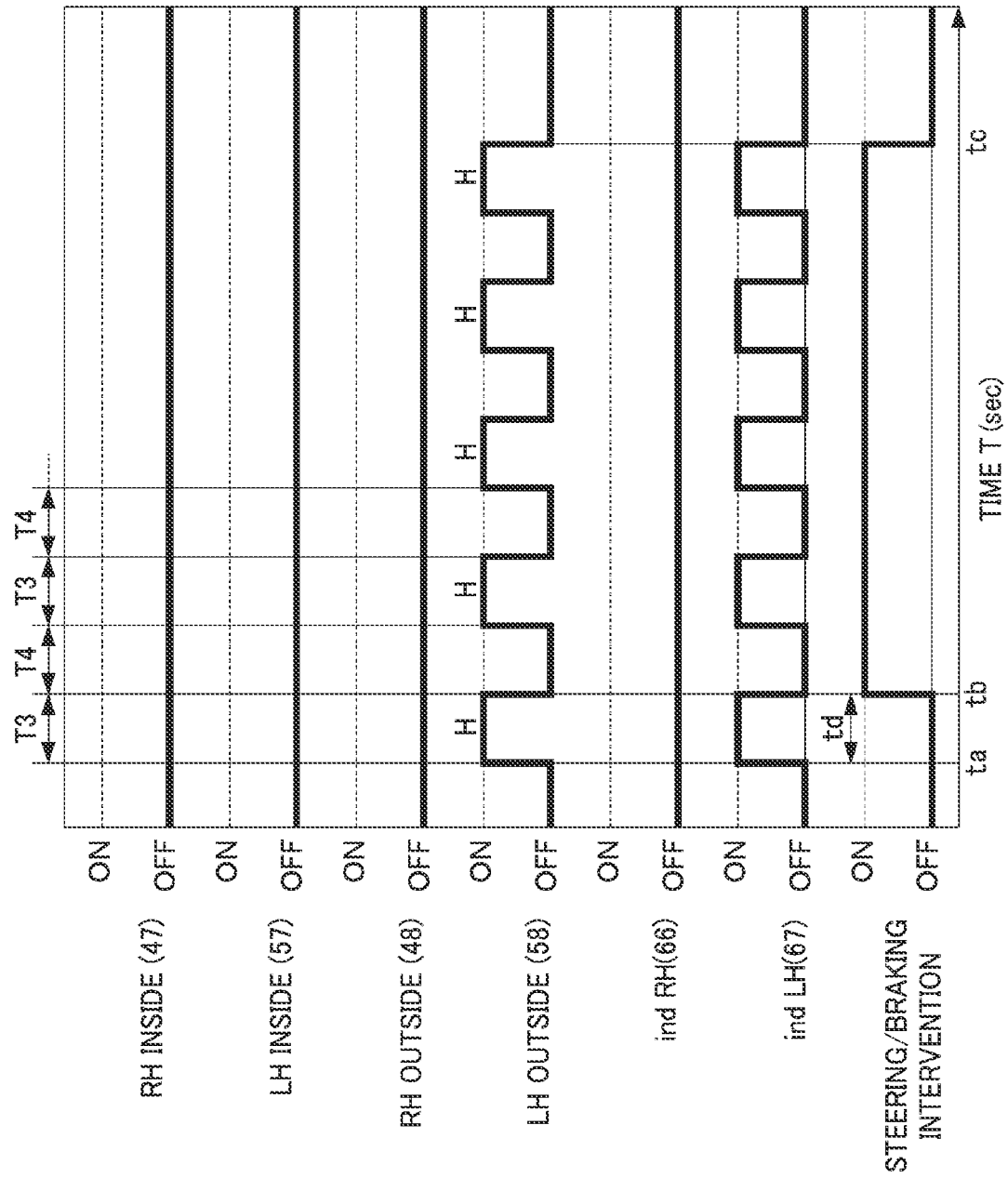
FIG. 10 is a graph showing temporal changes in the operation of various devices when a left steering intervention of the driving assistance device is operated.

FIG. 10 shows the operation mode of each of the actuators 47, 48, 57, and 58 during the operation of the automatic steering intervention function shown in FIG. 9.

During the operation of the automatic steering intervention function shown in FIG. 9, only the left outer actuator 58 of the left grip 41A starts vibrating for a predetermined time T3 (for example, 0.5 to 1 second). Further, the left outer actuator 58 repeats the vibration of the time T3 at the time interval of the predetermined time T4 (for example, 0.5 to 1 second). That is, the left outer actuator 58 is vibrated intermittently at a period (T3+T4) shorter than a period (T1+T2) in the standby state during the above-described operation.

Further, the left outer actuator 58 is vibrated intermittently at a predetermined high frequency H during the above-described operation.

When the left outer actuator 58 is vibrated during the above-described operation, the following operations occur. That is, the left indicator lamp 67 also emits light while being interlocked (synchronized) with the vibration of the left outer actuator 58.

Here, the timing ta at which the left outer actuator 58 starts vibrating and the left indicator lamp 67 starts blinking is set as follows. That is, the timing ta is earlier than a timing tb at which the automatic steering intervention function starts operating by a time td (for example, about 1 second). That is, the vibrating of the left outer actuator 58 and the blinking of the left indicator lamp 67 start before the operation of the automatic steering intervention function. Accordingly, it is possible to notify the driver of the start of the operation of the automatic steering intervention function in advance.

Additionally, the vibrating of the left outer actuator 58 and the blinking of the left indicator lamp 67 stop simultaneously at the timing tc when the operation of the automatic steering intervention function stops.

Figure 11:
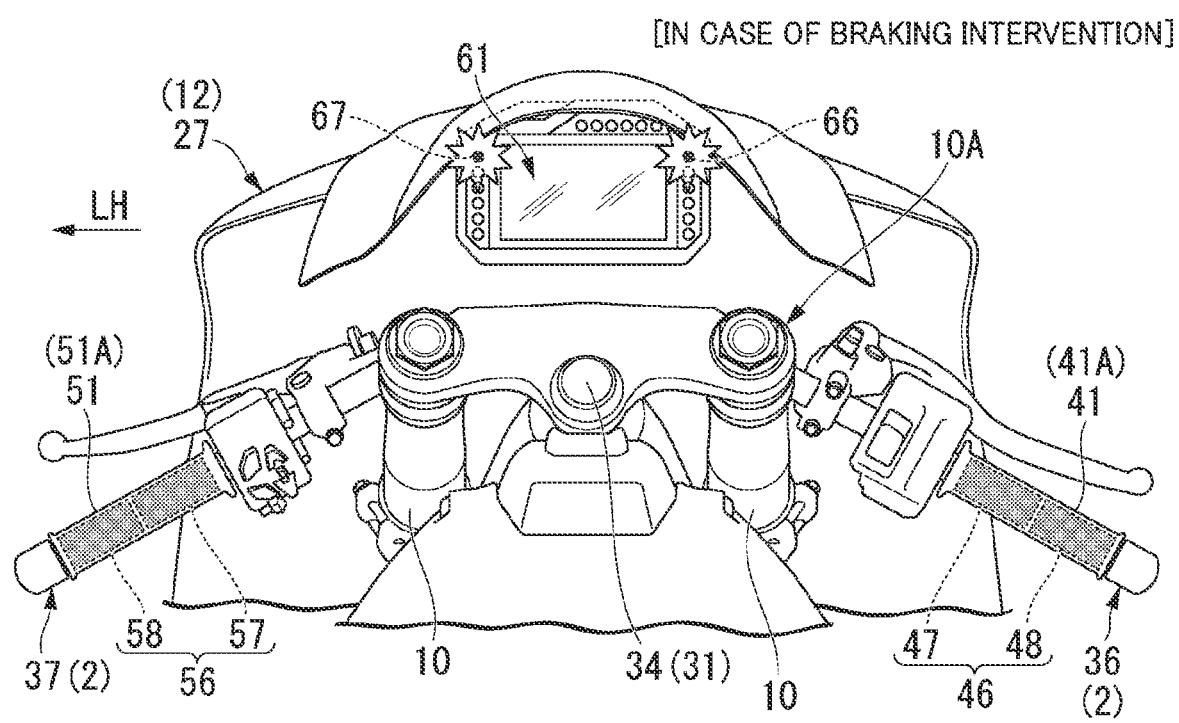
FIG. 11 is an explanatory diagram of the operation when a braking intervention of the driving assistance device is operated.

FIG. 11 shows a state in which the driving assistance device 70 operates the automatic braking intervention function from the standby state and is about to brake the motorcycle 1.

The automatic braking intervention function of the embodiment vibrates both of the left and right grips 41A and 51A since there is no relevance in the left and right direction. The automatic braking intervention function is assumed to induce the driver's bodily behavior and to be urgent. Therefore, all of the actuators 47, 48, 57, and 58 of the left and right grips 41A and 51A are vibrated. At this time, each of the actuators 47, 48, 57, and 58 is vibrated continuously without any time interval instead of intermittently vibrating.

Further, both of the right indicator lamp 66 and the left indicator lamp 67 emit light (light up) while being interlocked (synchronized) with the vibration of each of the actuators 47, 48, 57, and 58. This light emission is not limited to lighting, and may be blinking.

Figure 12:
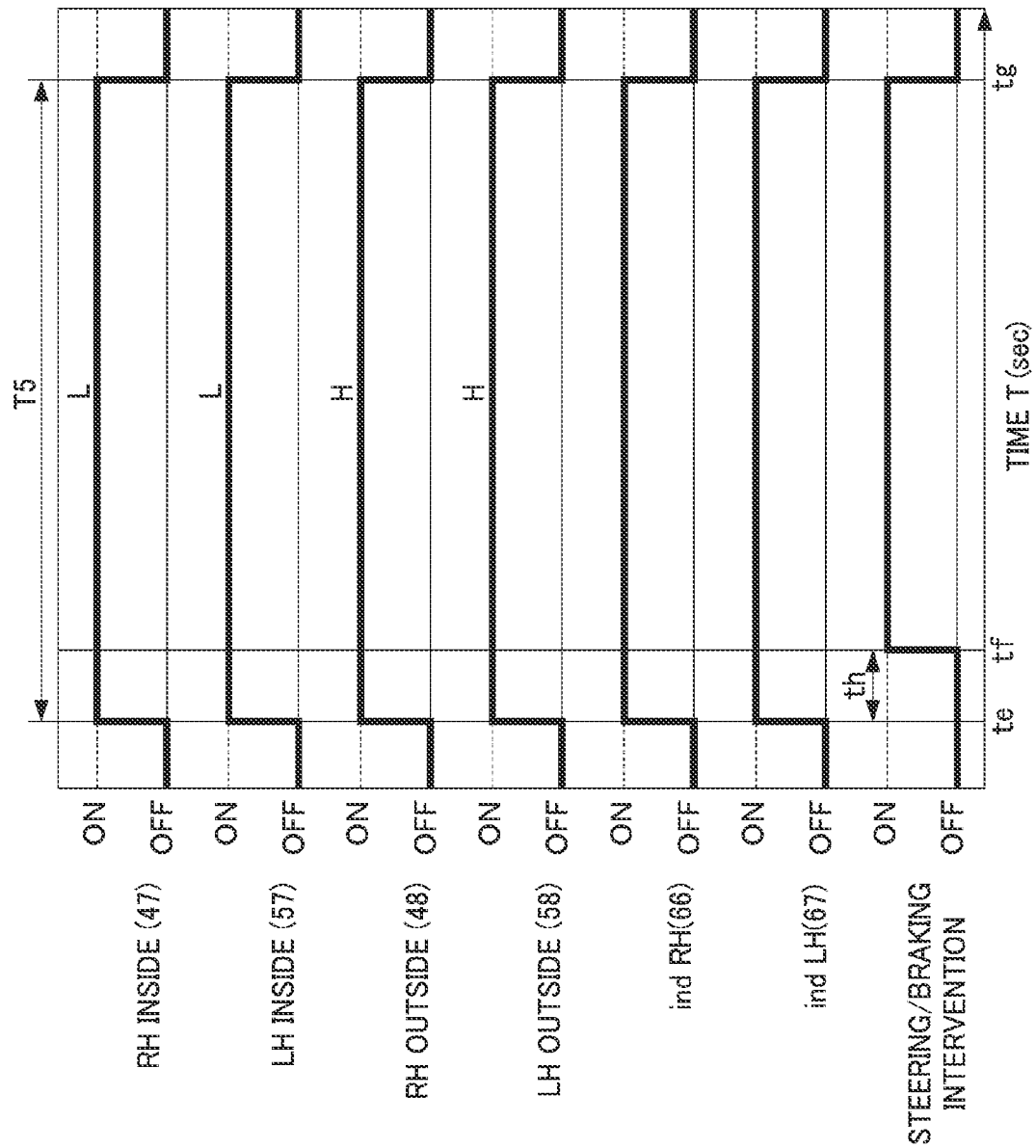
FIG. 12 is a graph showing temporal changes in the operation of various devices when the braking intervention of the driving assistance device is operated.

FIG. 12 shows the operation mode of each of the actuators 47, 48, 57, and 58 during the operation of the automatic braking intervention function.

When the automatic braking intervention function is operated by an obstacle or the like in front of the motorcycle 1, all of the actuators 47, 48, 57, and 58 start vibrating. Further, both of the indicator lamps 66 and 67 start lighting while being interlocked (synchronized) with this vibration. These operations are performed continuously without a time interval during the time T5 when the automatic braking intervention function is operated.

At this time, the right inner actuator 47 and the left inner actuator 57 are vibrated at a low frequency L. The right outer actuator 48 and the left outer actuator 58 are vibrated at a high frequency H.

Here, a timing te at which each of the actuators 47, 48, 57, and 58 starts vibrating and each of the indicator lamps 66 and 67 starts lighting is set as follows. That is, the timing te is earlier than a timing tf at which the automatic braking intervention function starts operating by a time th (for example, about 1 second). That is, the vibrating of each of the actuators 47, 48, 57, and 58 and the lighting of each of the indicator lamps 66 and 67 are started before the operation of the automatic braking intervention function. Accordingly, it is possible to notify the driver of the start of the operation of the automatic braking intervention function in advance.

Additionally, the vibrating of each of the actuators 47, 48, 57, and 58 and the blinking of each of the indicator lamps 66 and 67 stop simultaneously at the timing tg when the operation of the automatic steering intervention function stops.

As described above, the vehicle information notification device of the above-described embodiment includes the pair of left and right grips 41A and 51A formed on the steering handle 2 and the vibration device (the right inner actuator 47, the right outer actuator 48, the left inner actuator 57, and the left outer actuator 58) disposed on at least one of the pair of left and right grips 41A and 51A (both in the embodiment) to notify the driver of predetermined information. The plurality of vibration devices are provided on one of the left and right grips. That is, the right inner actuator 47 and the right outer actuator 48 are provided on the right grip 41A. The left inner actuator 57 and the left outer actuator 58 are provided on the left grip 51A.

According to this configuration, the vibration device for notifying the driver of information is disposed on at least one of the pair of left and right grips 41A and 51A of the steering handle 2. The plurality of vibration devices are provided on at least one of the left and right grips. Accordingly, it is possible to combine not only the presence or absence of vibration by the vibration device but also the difference in which of the plurality of vibration devices are to be operated. Accordingly, it is possible to notify the driver of more information and to increase the types of information to be notified.

Further, in the above-described vehicle information notification device, the plurality of vibration devices are provided on each of both of the pair of left and right grips 41A and 51A. Accordingly, it is also possible to combine the difference in which of the left and right grips 41A and 51A is to be vibrated. Accordingly, it is possible to further notify the driver of more information and to further increase the types of information to be notified.

Further, the above-described vehicle information notification device has an operation intervention function that can intervene in the operation performed by the driver. Each of the plurality of vibration devices is vibrated while being interlocked with the operation intervention function. Accordingly, it is possible to notify the driver of the operation of the operation intervention function by the vibration of the vibration device.

Further, the above-described vehicle information notification device has at least one of the steering intervention function and the braking intervention function (both in the embodiment) as the operation intervention function. Accordingly, it is possible to notify the driver of the operation of at least one of the steering intervention function and the braking intervention function by the vibration of the vibration device.

Further, in the vehicle information notification device, the plurality of vibration devices (the right inner actuator 47 and the right outer actuator 48 in the right grip 41A and the left inner actuator 57 and the left outer actuator 58 in the left grip 51A) provided on one of the left and right grips are arranged side by side in the axial direction which is elongated in the vehicle width direction of each of the grips 41A and 51A. In the plurality of vibration devices provided on each of the grips 41A and 51A, the vibration device (the right outer actuator 48 and the left outer actuator 58) which is disposed on the outside of each of the grips 41A and 51A in the vehicle width direction is vibrated while being interlocked with the steering intervention function. Accordingly, it is possible to notify the steering direction of the steering intervention function by the vibration of the vibration device on the outside of each of the grips 41A and 51A in the vehicle width direction to be easily understood.

Further, in the vehicle information notification device, the vibration device (the right inner actuator 47 and the left inner actuator 57) disposed on the inside of each of the grips 41A and 51A in the vehicle width direction in the plurality of vibration devices provided on each of the grips 41A and 51A is vibrated while being interlocked with the braking intervention function. Accordingly, it is possible to notify the operation of the braking intervention function by the vibration of the vibration device on the inside of each of the grips 41A and 51A in the vehicle width direction to be easily understood.

Further, in the vehicle information notification device, the plurality of vibration devices are vibrated as below in the standby state in which the system of the operation intervention function is activated and the operation intervention function is not operated yet. That is, the plurality of vibration devices are vibrated in a vibration mode different from that when the operation intervention function is operated. Accordingly, it is possible to notify the driver of the standby state in which the system of the operation intervention function is activated and the operation intervention function is operable.

Further, in the vehicle information notification device, the vibration device (the right outer actuator 48 and the left outer actuator 58) operated when the operation intervention function is operated in the plurality of vibration devices is vibrated as below. That is, the vibration device which is operated when the operation intervention function is operated is vibrated at a frequency H higher than a frequency L of the vibration device (the right inner actuator 47 and the left inner actuator 57) operated in the standby state. Accordingly, it is possible to notify the driver that the operation intervention function has been transitioned from the standby state to the operation state.

Further, in the vehicle information notification device, the vibration device (the right inner actuator 47 and the left inner actuator 57) operated in the standby state in the plurality of vibration devices is vibrated intermittently at a predetermined first time interval. The vibration device (each of the actuators 47, 48, 57, and 58) operated when the operation intervention function is operated is vibrated intermittently at a second time interval shorter than the first time interval or is vibrated continuously without any time interval. Even in this configuration, it is possible to notify the driver that the operation intervention function has transitioned from the standby state to the operation state.

Further, in the vehicle information notification device, when the operation intervention function is operated, the vibration device (each of the actuators 47, 48, 57, and 58) starts vibrating at the timings ta and te earlier than the timings tb and tf of the start of the operation of the operation intervention function. Accordingly, it is possible to notify the driver of the start of the operation of the operation intervention function in advance.

Further, in the vehicle information notification device in, the display device (the right indicator lamp 66 and the left indicator lamp 67) is further provided to display predetermined information for the driver while being interlocked with the vibration of the vibration device (each of the actuators 47, 48, 57, and 58). Accordingly, it is possible to more reliably notify the driver of information by the vibration of the vibration device and the display of the display device.

Additionally, the present invention is not limited to the above-described embodiment. For example, the driving assistance device 70 has the steering intervention function and the braking intervention function as the operation intervention function, but the present invention is not limited thereto. That is, the driving assistance device 70 may have only one of the steering intervention function and the braking intervention function as the operation intervention function.

In the embodiment, an example of notifying operation information of the device related to driving assistance is shown, but the present invention is not limited thereto. That is, the notification may be, for example, information from a navigation system or ITS (Intelligent Transport Systems).

The present invention is not limited to a configuration in which the plurality of vibration devices are provided on both of the left and right grips. That is, the present invention may be a configuration in which the plurality of vibration devices are provided only in one of the left and right grips. Further, one of the left and right grips may include a single vibration device or may not include any vibration device.

The handle according to the present invention is not limited to left and right separate handles. That is, a left and right integrated bar handle may be used and the handle may not be a bar type handle.

The saddle type vehicle includes all vehicles in which the driver straddles the vehicle body. That is, the saddle type vehicle includes not only motorcycles (including motorized bicycles and scooter-type vehicles), but also vehicles with three wheels (including vehicles with one front wheel and two rear wheels as well as vehicles with two front wheels and one rear wheel) or four wheels. Further, the saddle type vehicle also includes vehicles whose prime mover includes an electric motor. Further, the present invention is not limited to a saddle type vehicle and can be applied to general vehicles having left and right grips on steering handles.

Then, the configuration of the above-described embodiment is an example of the present invention. That is, various modifications can be made without departing from the gist of the present invention, such as replacing the constituent elements of the embodiments with well-known constituent elements.

BRIEF DESCRIPTION OF THE REFERENCE SYMBOLS

1: Motorcycle (saddle type vehicle)
2: Handle
41A: Right grip (grip)
47: Right inner actuator (vibration device)
48: Right outer actuator (vibration device)
51A: Left grip (grip)
57: Left inner actuator (vibration device)
58: Left outer actuator (vibration device)
66: Right indicator lamp (display device)
67: Left indicator lamp (display device)
L: Low frequency (frequency of standby state)
H: High frequency (frequency higher than standby state)
T2: (First time interval)
T4: (Second time interval)
tb and tf: Timing to start operation intervention function
ta and te: (Timing earlier than start of operation intervention function)

What is claim is:

1. A vehicle information notification device comprising: a pair of left and right grips which are formed on a steering handle; and a vibration device which is an actuator disposed on at least one of the pair of left and right grips to notify a driver by giving predetermined vibration information,
   wherein a plurality of vibration devices are provided on one of the left and right grips,
   wherein an operation intervention function is provided to intervene in an operation performed by the driver based on an object information detected by a camera or a radar,
   wherein the operation intervention function includes at least one of a steering intervention function that assists the steering handle by applying an assist torque and a breaking intervention function that assist a breaking of vehicle wheel by generating an assist braking force,
   wherein the vibration device is vibrated while being interlocked with the operation intervention function,
   wherein the vibration device is vibrated in a vibration mode different from that when the operation intervention function is operated in a standby state in which a system of the operation intervention function is activated and the operation intervention function is not operated yet, and
   wherein the vibration device is vibrated intermittently at a predetermined first time interval in the standby state and is vibrated intermittently at a second time interval shorter than the first time interval or is vibrated continuously without any time interval when the operation intervention function is operated.

2. The vehicle information notification device according to claim 1,
   wherein both of the pair of left and right grips are respectively provided with the plurality of vibration devices.

3. The vehicle information notification device according to claim 1,
   wherein the plurality of vibration devices provided on one of the left and right grips are arranged side by side in an axial direction which is elongated in a vehicle width direction of the grip, and wherein the vibration device which is disposed on an outside of the grip in the vehicle width direction in the plurality of vibration devices is vibrated while being interlocked with the steering intervention function.

4. The vehicle information notification device according to claim 1,
wherein the plurality of vibration devices provided on one of the left and right grips are arranged side by side in the axial direction which is elongated in the vehicle width direction of the grip, and
wherein the vibration device which is disposed on an inside of the grip in the vehicle width direction in the plurality of vibration devices is vibrated while being interlocked with the braking intervention function.

5. The vehicle information notification device according to claim 1,
wherein the vibration device is vibrated at a first frequency higher than a second frequency of the standby state when the operation intervention function is operated.

6. The vehicle information notification device according to claim 1,
wherein the vibration device starts vibrating at a timing earlier than a timing of starting the operation of the operation intervention function when the operation intervention function is operated.

7. The vehicle information notification device according to claim 1, further comprising:
a display device which displays the predetermined vibration information for the driver while being interlocked with a vibration of the vibration device.

8. The vehicle information notification device according to claim 1,
wherein the operation intervention function includes both of the automatic steering intervention function and the automatic braking intervention function,
wherein the vibration device is vibrated intermittently at predetermined first time interval in the standby state and is vibrated intermittently at a second time interval shorter than the first time interval when the automatic steering intervention function is operated, and
wherein the vibration device is vibrated continuously without any time interval when the automatic braking intervention function is operated.

9. The vehicle information notification device according to claim 1,
wherein the vehicle is a motorcycle or the like, and steering intervention function steers the steered wheel in the opposite direction to a side on which a course a vehicle is to be changed, and
wherein only one side of the vibration device on the course change direction of the vehicle is vibrated when the steering intervention function is operated.

* * * * *